(12) United States Patent  
Munshi

(10) Patent No.: US 6,514,276 B2  
(45) Date of Patent: Feb. 4, 2003

(54) METALLIZED FILM CAPACITOR FOR USE IN IMPLANTABLE DEFIBRILLATOR

(75) Inventor: Mohammed Zafar Amin Munshi, Missouri City, TX (US)

(73) Assignee: Intermedics, Inc., Angleton, TX (US)

(*) Notice: Subject to any disclaimer, the term of this patent is extended or adjusted under 35 U.S.C. 154(b) by 0 days.

(21) Appl. No.: 09/782,443

(22) Filed: Feb. 13, 2001

(65) Prior Publication Data

US 2001/0011183 A1 Aug. 2, 2001

Related U.S. Application Data

(62) Division of application No. 09/065,131, filed on Apr. 23, 1998, now Pat. No. 6,187,028.

(51) Int. Cl.$^7$ .................................................. A61N 1/00
(52) U.S. Cl. ........................................... 607/1; 361/511
(58) Field of Search ..................... 29/25.42; 361/301.1, 361/301.5, 303, 311–313, 323, 511; 607/1, 2, 5

(56) References Cited

U.S. PATENT DOCUMENTS

| | | | |
|---|---|---|---|
| 3,398,333 A | 8/1968 | Zeppieri | 317/230 |
| 3,555,369 A | 1/1971 | Yoshino et al. | 317/230 |
| 3,659,615 A | 5/1972 | Enger | 128/419 P |
| 3,765,956 A | 10/1973 | Li | 148/33 |
| 3,789,502 A | 2/1974 | Callins et al. | 29/570 |
| 3,918,460 A | 11/1975 | King et al. | 128/419 P |
| 3,943,937 A | 3/1976 | King et al. | 128/419 P |
| 4,041,955 A | 8/1977 | Kelly et al. | 128/419 P |
| 4,041,956 A | 8/1977 | Purdy et al. | 128/419 P |
| 4,121,274 A | * 10/1978 | Simson et al. | 29/25.42 |
| 4,127,890 A | 11/1978 | Rayburn | 361/309 |
| 4,136,435 A | 1/1979 | Li | 29/572 |
| 4,146,914 A | 3/1979 | Rayburn | 361/304 |
| 4,183,600 A | 1/1980 | Schroeder | 339/218 R |
| 4,243,042 A | 1/1981 | Ware | 128/419 P |
| 4,333,469 A | 6/1982 | Jeffcoat et al. | 128/419 F |

(List continued on next page.)

FOREIGN PATENT DOCUMENTS

| | | | |
|---|---|---|---|
| DE | 3432816 A1 | 9/1984 | H01G/4/32 |
| EP | 780857 A2 | 12/1996 | H01G/4/18 |
| EP | 0753868 | 1/1997 | H01G/9/012 |
| EP | 0851446 | 7/1998 | H01G/9/055 |
| WO | 99/51301 | 10/1999 | A61N/1/375 |
| WO | 99/51302 | 10/1999 | A61N/1/375 |
| WO | 99/51303 | 10/1999 | A61N/1/39 |
| WO | 99/66985 | 12/1999 | A61N/1/39 |

OTHER PUBLICATIONS

Database WPI Abstract, XP–002126511, An– 1997–031410 (03), Publication No. JP 08293430, Derwent Publications Ltd., London, GB, 1 p., (Nov. 5, 1996).

Patent Abstracts of Japan, 15 (40), Publication No. 02276222 (U. Noriki), 1 p., (Nov. 13, 1990).

(List continued on next page.)

Primary Examiner—Kennedy Schaetzle  
Assistant Examiner—Kristen L Droesch  
(74) Attorney, Agent, or Firm—Schwegman, Lundberg, Woessner & Kluth, P.A.

(57) ABSTRACT

A thin film capacitor for use in an implantable defibrillator. A first dielectric polymer film layer has a metallized film on one side thereof. A second dielectric polymer film layer has a metallized film on one side thereof. The first and second layers are overlain on each other and wound spirally with the metallized film of one layer adjacent the dielectric polymer of the other layer. The beginnings and ends of the first and second metallized films are offset from the respective beginnings and ends of the first and second polymer film layers. The dielectric layers can be tapered in increasing thickness toward the respective beginnings and ends of the layers. The dielectric layers can themselves comprise at least two layers of differing polymer materials, the preferred materials being polyvinylidene fluoride and polyester for improved energy density and self-healing properties.

5 Claims, 4 Drawing Sheets

U.S. PATENT DOCUMENTS

| | | | |
|---|---|---|---|
| 4,371,406 A | 2/1983 | Li | 148/171 |
| 4,385,342 A | 5/1983 | Puppolo et al. | 361/433 |
| 4,387,113 A | 6/1983 | Behn | 427/40 |
| 4,395,305 A | 7/1983 | Whitman | 156/665 |
| 4,409,642 A | 10/1983 | Edson | 361/433 |
| 4,454,563 A | 6/1984 | James | 361/306 |
| 4,516,187 A | 5/1985 | Lavene | 361/309 |
| 4,521,830 A | 6/1985 | Aultman et al. | 361/433 |
| 4,546,415 A | 10/1985 | Kent et al. | 361/433 |
| 4,663,824 A | 5/1987 | Kenmochi | 29/570 |
| 4,690,714 A | 9/1987 | Li | 437/208 |
| 4,692,147 A | 9/1987 | Duggan | 604/93 |
| 4,771,362 A | 9/1988 | Behn | 361/306 |
| 4,782,235 A | 11/1988 | Lejeune et al. | 250/423 R |
| 4,907,130 A | 3/1990 | Boulloy et al. | 361/529 |
| 4,942,501 A | 7/1990 | MacFarlane et al. | 361/523 |
| 4,944,300 A | 7/1990 | Saksena | 128/419 D |
| 4,987,519 A | 1/1991 | Hutchins et al. | 361/518 |
| 5,040,093 A | 8/1991 | Greuel | 361/321 |
| 5,051,862 A | 9/1991 | Pageaud et al. | 361/308 |
| 5,055,889 A | 10/1991 | Beall | 357/14 |
| 5,055,975 A | 10/1991 | Behrend | 361/527 |
| 5,086,374 A | 2/1992 | MacFarlane et al. | 361/525 |
| 5,131,388 A | 7/1992 | Pless et al. | 128/419 D |
| 5,146,391 A | 9/1992 | MacFarlane et al. | 361/525 |
| 5,153,820 A | 10/1992 | MacFarlane et al. | 361/525 |
| 5,245,499 A | 9/1993 | Senes | 361/56 |
| 5,275,621 A | 1/1994 | Mehra | 607/5 |
| 5,324,910 A | 6/1994 | Isawa | 219/118 |
| 5,370,663 A | 12/1994 | Lin | 607/5 |
| 5,380,341 A | 1/1995 | Matthews et al. | 29/25.03 |
| 5,439,760 A | 8/1995 | Howard et al. | 429/94 |
| 5,456,698 A | 10/1995 | Byland et al. | 607/36 |
| 5,468,984 A | 11/1995 | Efland et al. | 257/356 |
| 5,500,534 A | 3/1996 | Robinson et al. | 250/385.1 |
| 5,522,851 A | 6/1996 | Fayram | 607/5 |
| 5,536,960 A | 7/1996 | Hayashi | 257/369 |
| 5,536,964 A | 7/1996 | Green et al. | 257/432 |
| 5,545,184 A | 8/1996 | Dougherty | 607/5 |
| 5,584,890 A | 12/1996 | MacFarlane et al. | 29/25.03 |
| 5,591,211 A | 1/1997 | Meltzer | 607/5 |
| 5,597,658 A | 1/1997 | Kejha | 429/94 |
| 5,628,801 A | 5/1997 | MacFarlane et al. | 29/25.03 |
| 5,642,252 A | 6/1997 | Sakamoto et al. | 361/93 |
| 5,660,737 A | 8/1997 | Elias et al. | 216/6 |
| 5,661,625 A | 8/1997 | Yang | 361/92 |
| 5,661,629 A | 8/1997 | MacFarlane et al. | 361/505 |
| 5,674,260 A | 10/1997 | Weinberg | 607/36 |
| 5,677,539 A | 10/1997 | Apotovsky et al. | 250/370.13 |
| 5,688,698 A | 11/1997 | Robinson et al. | 437/3 |
| 5,697,953 A | 12/1997 | Kroll et al. | 607/5 |
| 5,698,453 A | 12/1997 | Green et al. | 437/3 |
| 5,711,861 A | 1/1998 | Ward et al. | 204/403 |
| 5,711,988 A | 1/1998 | Tsai et al. | 427/80 |
| 5,728,594 A | 3/1998 | Efland et al. | 437/40 |
| 5,737,179 A | 4/1998 | Shaw et al. | 361/301.5 |
| 5,748,439 A | 5/1998 | MacFarlane et al. | 361/525 |
| 5,776,628 A | 7/1998 | Kraft et al. | 429/94 |
| 5,800,857 A | 9/1998 | Ahmad et al. | 427/80 |
| 5,808,857 A | 9/1998 | Stevens | 361/503 |
| 5,814,082 A | 9/1998 | Fayram et al. | 607/5 |
| 5,837,995 A | 11/1998 | Chow et al. | 250/214 LS |
| 5,859,456 A | 1/1999 | Efland et al. | 257/335 |
| 5,867,363 A | 2/1999 | Tsai et al. | 361/502 |
| 5,895,416 A | 4/1999 | Barreras, Sr. et al. | 607/62 |
| 5,895,733 A | 4/1999 | Crespi et al. | 429/219 |
| 5,904,514 A | 5/1999 | Konuma et al. | 438/165 |
| 5,926,357 A | 7/1999 | Elias et al. | 361/302 |
| 5,930,109 A | 7/1999 | Fishler | 361/508 |
| 5,949,638 A | 9/1999 | Greenwood, Jr. et al. | 361/508 |
| 5,959,535 A | 9/1999 | Remsburg | 340/604 |
| 5,963,418 A | 10/1999 | Greenwood, Jr. et al. | 361/508 |
| 5,968,210 A | 10/1999 | Strange et al. | 29/25.03 |
| 5,980,977 A | 11/1999 | Deng et al. | 427/79 |
| 5,983,472 A | 11/1999 | Fayram et al. | 29/25.42 |
| 6,006,133 A | 12/1999 | Lessar et al. | 607/5 |
| 6,009,348 A | 12/1999 | Rorvick et al. | 607/5 |

OTHER PUBLICATIONS

Patent Abstracts of Japan, 16 (134), Publication No. 03296207 (K. Kaname), 1 p., (Dec. 26, 1991).

*Patent Abstracts of Japan, 16 (291)*, Publication No. 04074409 (A. Akiyoshi), 1 p., (Jul. 16, 1990).

*Patent Abstracts of Japan, 18(3)*, Publication No. 05251283 (T. Fumiyasu), 1 p., (Sep. 28, 1993).

*Patent Abstracts of Japan, 1996(6)*, Publication No. 08055762 (E. Akira), 1 p., (Feb. 27, 1996).

*Patent Abstracts of Japan, 97(12)*, Publication No. 09219343 (I. Toshihiko), 1 p., (Aug. 19, 1997).

Jenkins, et al., "Diagnosis of Atrial Fibrillation Using Electrogram from Chronic Leads: Evaluation of Computer Algorithm", *PACE, 11*, pp. 622–631, (1988).

Lunsman, P., et al., "High Energy Density Capacitors for Implantable Defibrillators", *Proceedings of the 16th Capacitor and Resistor Technology Symposium*, Monteleone Hotel, New Orleans, Louisiana, pp. 277–280, (Mar. 11–15, 1996).

Morris, et al., "Intracardiac Electrogram Transformation: Morphometric Implications for Implantable Devices", *Journal of Electrocardiology*, 29 Supplement, pp. 124–129, (1996).

Moynihan, J.D., et al., "Theory, Design and Application of Electrolytic Capacitors", Copyright by John D. Moynihan, 136 p., (1982).

Schuller, et al., "Far Field R–Wave Sensing—An Old Problem Repeating", *Pace, 19, Part II*, NASPE Abstract No. 264, p. 631, (1996).

Stephany, et al., "Real–Time Estimation of Magnitude–Square Coherence for Use in Implantable Devices", *IEEE Computers in Cardiology*, pp. 375–378, (1992).

* cited by examiner

METALLIZED FILM CAPACITOR FOR USE IN IMPLANTABLE DEFIBRILLATOR

CROSS REFERENCE TO RELATED APPLICATIONS

This application is a division of U.S. patent application Ser. No. 09/065,131, filed on Apr. 23, 1998, now issued as U.S. Pat. No. 6,187,028, the specification of which is incorporated herein by reference.

BACKGROUND OF THE INVENTION

1. Field of the Invention

The present invention relates generally to electrical energy storage capacitors, and more particularly to energy storage capacitors suitable for use in an implantable cardiac defibrillator.

2. Background Information

Implantable defibrillators are implanted in patients who are at risk of suffering cardiac arrhythmias, such as ventricular fibrillation, that can cause sudden death. The defibrillator detects the occurrence of ventricular fibrillation and automatically delivers defibrillating therapy in the form of a high-energy shock to the cardiac tissue. Implantable defibrillators in their most general form include appropriate electrical leads and electrodes for collecting electrical signals generated by the heart, and for delivering electric shocks to the heart. Also included are batteries and energy storage capacitors, and control circuitry connected to the leads, batteries and capacitors. The control circuitry senses the electrical activity of the heart and controls the charging of the capacitors and the delivery of the shocks through the leads to the heart.

Defibrillation therapy generally involves rapid delivery of a relatively large amount of electrical energy to the heart at high voltage. Typical values include 20 joules or more at 700 volts or more. Presently available batteries suitable for use in implantable defibrillators are not capable of delivering energy at such levels directly. Consequently, it is customary to provide a high-voltage energy storage capacitor that is charged by the battery via appropriate voltage transformation and charging circuitry. To avoid wasting battery energy, the high-voltage energy storage capacitor is not maintained in a charged state, but rather is charged after fibrillation has been identified by the control circuitry and immediately prior to delivering the shock.

The amount of electrical energy that must be transferred to cardiac tissue to effect defibrillation is quite large by the standards of other implantable cardiac stimulators, such as pacemakers and cardioverters, which treat bradycardia and tachycardia, respectively. Consequently, the physical volume of the energy storage capacitors employed in implantable defibrillators is substantial. Together with the battery, the energy storage capacitor presents a major limitation to reducing the overall size of the implanted device.

Conventional energy storage capacitors used in implantable defibrillators have employed an aluminum electrolytic capacitor technology that had been developed for photoflash capacitors. Aluminum electrolytic capacitors have plates of aluminum foil separated by a porous layer, often paper, impregnated with a viscous liquid electrolyte comprising ethylene glycol plus additives. Alternating layers of foil and paper are wound in a spiral about a mandrel to form a cylindrical capacitor. Electrical leads are attached to respective separate foil layers. The wound capacitor is placed in a cylindrical aluminum can, or housing, closed at one end and open at the other. The dielectric is formed at the electrolyte-to-plate interface by applying a controlled direct current between the leads of the capacitor. Periodically throughout life of the capacitor, especially after periods of non-use, that same process must be used to re-form the dielectric of the aluminum electrolytic capacitor. To complete the construction of the aluminum electrolytic capacitor, the open end of the aluminum can is closed by an elastomeric seal, through which the electrical leads project. The elastomeric seal prevents leakage of electrolyte from the aluminum can, but does not provide an hermetic seal. This permits venting of hydrogen gas that is normally liberated in the aluminum electrolytic capacitor during use.

While aluminum electrolytic capacitors have been used successfully in implantable defibrillators, certain of their characteristics are regarded as disadvantageous. For example, the outgassing characteristic is undesirable in a capacitor that is contained within an implantable device that itself must be hermetically sealed against intrusion by body fluids. The device either must be provided with internal hydrogen adsorbers or else made permeable to hydrogen to prevent an internal buildup of pressure. The relative thickness of the aluminum foil plates and paper separators, as well as the head room required at the ends of the capacitor housing, place upper limits on the energy density of the aluminum electrolytic capacitor, resulting in a relatively bulky device. This is undesirable in the context of pectorally implanted defibrillators which, for reasons related to ease of implantation, comfort and cosmetics, are desired to be as small as possible. Typical aluminum electrolytic photoflash capacitors have energy densities of about 1.8 Joules per cubic centimeter. Also, aluminum electrolytic capacitors typically have a maximum working voltage of about 380 V, whereas implantable defibrillators are usually designed to deliver a shock at 700 V or more. Consequently, two capacitors must be employed in series to achieve the desired working voltage. This results in inefficient space utilization in the implantable device. The need to periodically reform the dielectric of the aluminum electrolytic capacitor is also an undesirable characteristic of a capacitor enclosed in a self contained, battery powered, implanted device. The periodic reformation consumes energy from the battery that otherwise would be available for therapeutic use, thereby reducing the longevity of the implanted device.

Another capacitor technology that has been considered for use in implantable defibrillators is the ceramic dielectric capacitor. The ceramic capacitor has advantages over the aluminum electrolytic capacitor in that it is free of outgassing and does not need periodic reformation. Nevertheless, the ceramic capacitor has been difficult to manufacture with the working voltage and reliability characteristics needed for use in an implantable defibrillator. For example, working voltages above about 400 V have been difficult to achieve. A single local defect in the ceramic dielectric can result in a short circuit between the plates, resulting in catastrophic failure of the capacitor. Also, ceramic capacitors are relatively heavy. Excess weight is undesirable in an implantable device because it can complicate the task of reliably anchoring the device to adjacent tissue and may raise issues of patient comfort.

Yet another capacitor technology that has been considered for use in implantable defibrillators is the thin polymer film capacitor. Such capacitors employ a thin polymer dielectric film between the metallic capacitor plates, as opposed to the electrolyte dielectric material of the typically employed photoflash aluminum electrolytic capacitor. The plates of the thin polymer film capacitor usually take the form of very thin metal layers that are vapor deposited directly to the dielectric substrate to a thickness of about 150 to 350 angstroms. The result is a so-called metallized polymer film that provides both the dielectric and plate functions of the capacitor. Typically, two layers of metallized polymer film are overlaid and are tightly wound about a mandrel to form a wound cylindrical capacitor. The metallized layers on the two polymer films are offset from opposite respective edges of the films, allowing alternate plates of the spiral-wound structure to be soldered together at opposite ends of the cylindrical capacitor and connected to respective leads. A capacitor wound from metallized polymer film can be constructed with a relatively high energy density because of the efficient use of space permitted by the extremely thin metal plates, and because working voltages well in excess of 700 V can be achieved in a single capacitor. The energy density that can be achieved is limited primarily by the manufacturability of polymer films of arbitrarily small thickness, and by the dielectric properties of the particular polymer film, which dictate the minimum thickness required for a particular design voltage. Energy densities of about one (1) Joule per cubic centimeter are typical for polyester film capacitors, for example. Polyester has a dielectric constant of about 2.5 to 3.0.

An advantageous characteristic of the metallized, thin polymer film capacitor is its ability to self-heal, or clear, minor defects in the dielectric when subjected to an initial clearing voltage greater than its designed working voltage. This characteristic provides a capacitor of high reliability. During clearing, imbedded foreign particles or micro-flaws in the capacitor dielectric lead to localized breakdowns of the film dielectric. The breakdown event results in an arc between the two metallized layers that develops a localized high temperature and pressure. A puncture develops in the polymer film, and the thin metallized plate in the vicinity of the failure site is rapidly vaporized and blown away from the puncture. The evaporation of the electrode around the arc causes it to extinguish, which electrically isolates the two plates on either side of the dielectric film in the vicinity of the puncture. This prevents large-scale damage and catastrophic failure of the capacitor. The clearing process removes an electrode area that is a very small percentage of the entire area of the capacitor plate electrodes, resulting in no significant loss of capacitance. As a general rule, the more flexible and elastic the film material is, and the lower the pressure between the winding layers, the greater the probability that a puncture will self-heal. When inter-layer (radial) pressures are high, the gas pressure associated with the arc increases rapidly, damaging adjacent layers and extinguishing the arc prematurely. This incomplete burning leaves behind a carbon residue that continues to conduct, leading to a thermal runaway that melts many layers of metallized plastic film and generates a catastrophic, high resistance short.

Some polymer films demonstrate better clearing characteristics than others do. In general, polymers that burn well, i.e., that will sustain a flame once ignited, have good clearing properties. Such polymers usually have oxygen in their molecular structure, e.g., polyester, but there are notable exceptions, such as polypropylene.

One promising polymer film for constructing a high energy-density thin film capacitors is polyvinylidene fluoride, or PVDF. This material has a very-high dielectric constant, i.e., k=12, which presents the possibility of constructing a capacitor with very thin films. This would permit more windings within a given capacitor diameter, which increases the plate area within a given cylindrical volume and increases the energy density. Energy densities of about 4 Joules per cubic centimeter are possible with a PVDF dielectric. Also, PVDF exhibits lower leakage than aluminum electrolytic capacitors, with leakage currents on the order of tens of micro-amps rather than hundreds or thousands of microamps. Compared with polyester, however, PVDF has relatively poor self-healing, or clearing, characteristics.

Evaluations of capacitors constructed using metallized thin films of PVDF have shown electrical degradation at voltages lower than expected, considering the inherent voltage breakdown characteristics of PVDF. For example, two metallized layers of PVDF were cylindrically (spirally) wound on a mandrel having a diameter of about 2 to 3 mm. The layers were wound until the capacitor had a diameter of about 14.5 to 15 mm, with a height of about 50 mm. The PVDF film had a thickness of about 6 microns, and the metallized layers were offset about 2.5 mm from respective opposite ends of the cylindrical construct. In theory, such a capacitor should have withstood at least 2000 V without breakdown, but in fact exhibited voltage breakdown at about 800 V to about 1050 V. Subsequent examination of the failed capacitors revealed many successful clearings of minor defects, as well as some catastrophic failures involving localized voltage breakdown through several layers of dielectric film. The catastrophic failures had not taken place at locations distributed uniformly over the film, but rather had been concentrated at the beginning (near the mandrel) and at the end (on the surface of the capacitor) of the film. It was noted that the failures at the end of the windings were due to shorting between the edges of the two films. The polymer film from which the capacitor had been wound had not been de-metallized at the last few turns. It was also noted that the film windings at the center of the capacitor, i.e., at the beginning of the winding near the mandrel, were very wrinkled. The wrinkling is believed to have been caused by the winding process in which the first few turns resist bending smoothly at the small radius involved. The wrinkling may have resulted in localized areas of high inter-layer pressure in which breakdown events that ordinarily would have terminated in a self-healing, nevertheless cascaded through several layers into catastrophic failure.

It would be desirable to provide improvements in the design of and manufacturing steps for making thin film capacitors to permit the full potential of very thin films of PVDF to be exploited to increase the energy density of the capacitor. These and other advantages are provided by the present invention.

SUMMARY OF THE INVENTION

In accordance with one aspect of the present invention, a thin film capacitor for use in an implantable defibrillator includes first and second dielectric polymer film layers, each of the first and second dielectric polymer film layers having a metallized film on one side thereof. The first and second dielectric polymer film layers are overlain on each other and wound spirally with the metallized film of one layer adjacent the dielectric polymer of the other layer. The beginnings of the metallized films are offset from the respective beginnings of the first and second polymer film layers in the direction of winding.

In accordance with a further aspect of the present invention, the first and second dielectric polymer film layers are tapered in increasing thickness from a middle portion of uniform thickness toward the respective beginnings and ends of the dielectric polymer film layers.

In accordance with yet another aspect of the present invention, each of the first and second dielectric polymer film layers comprises at least two layers of differing polymer materials, one of which provides the primary dielectric characteristics of the capacitor and the other of which provides enhanced self-healing characteristics.

It is an object of the present invention to provide an improved electrical energy storage capacitor for use in an implantable defibrillator.

Other objects and advantages of the invention will be apparent from the following descriptions of preferred embodiments made with reference to the drawings.

DETAILED DESCRIPTION OF THE PREFERRED EMBODIMENTS

Figure 1:
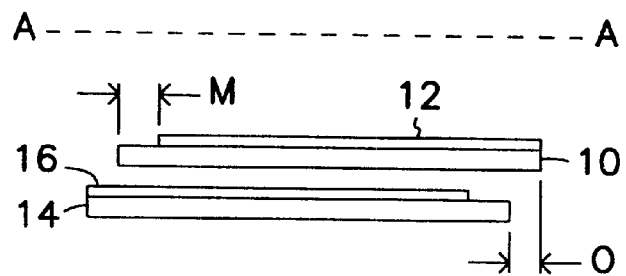
FIG. 1 is an end view of a prior art arrangement of metallized polymer films prior to being wound spirally about a mandrel to form a cylindrical capacitor.
Figure 2:
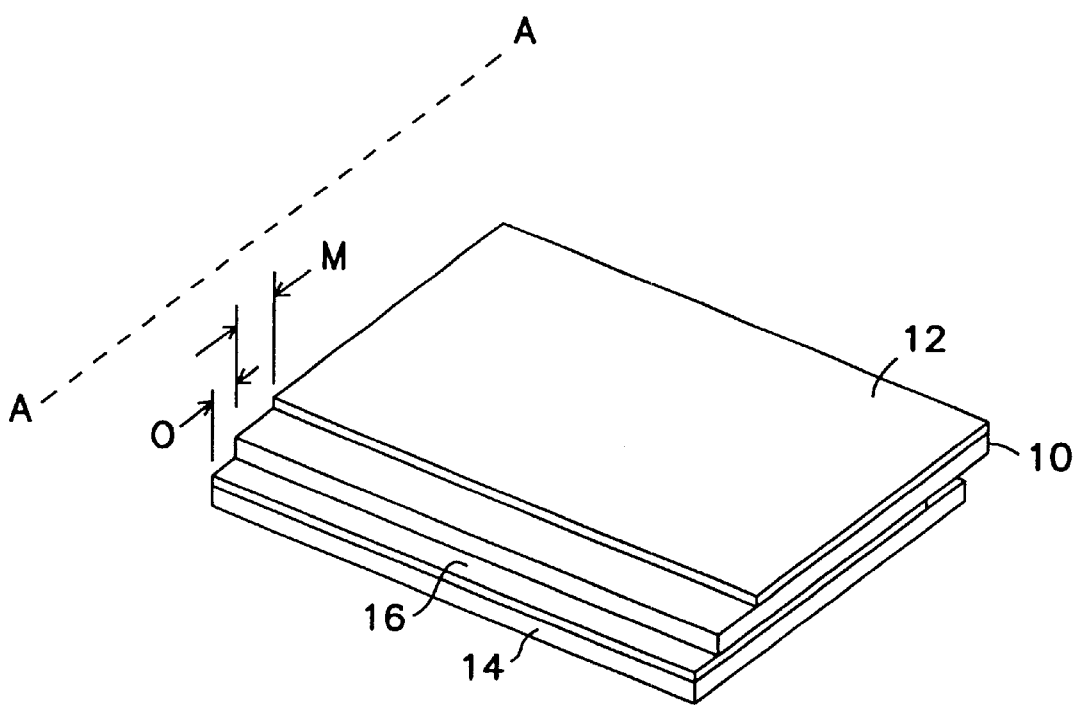
FIG. 2 is a perspective view of the prior art arrangement of metallized polymer films of FIG. 1.

Referring to FIGS. 1 and 2, a prior art arrangement of two layers of metallized polymer dielectric film is shown, prior to being wound spirally on a mandrel about axis A to form a cylindrical capacitor. The thickness of the layers, as illustrated, is greatly exaggerated. Polymer film layer 10 has deposited on the upper side thereof a thin metallic layer 12. Along one edge of film layer 10, perpendicular to the winding axis A, metallic layer 12 is spaced therefrom by a margin M. Similarly, polymer film layer 14 has deposited on the upper side thereof a thin metallic layer 16. Along one edge of film layer 14, perpendicular to the winding axis A and opposite to the edge referred to above with regard to polymer film layer 10, metallic layer 16 is spaced therefrom by a margin "M". Polymer layers 10 and 14 are offset relative to each other in the direction of the winding axis A by an offset "O", such that the edge having the margin "M" of each polymer layer is recessed relative to the non-margined edge of the other polymer layer. When layers 10 and 14, with their respective metallic layers 12 and 16, are wound spirally about winding axis A, one edge of metallic layer 12 is exposed at one end of the resulting cylindrical capacitor, whereas the opposite edge of metallic layer 16 is exposed at the opposite end of the resulting cylindrical capacitor. Solder is sprayed on one end of the capacitor in electrical contact with a continuous edge of one, but only one, of the metallic layers. Similarly, solder is sprayed on the opposite end of the capacitor in electrical contact with a continuous edge of only the other metallic layer.

Figure 3:
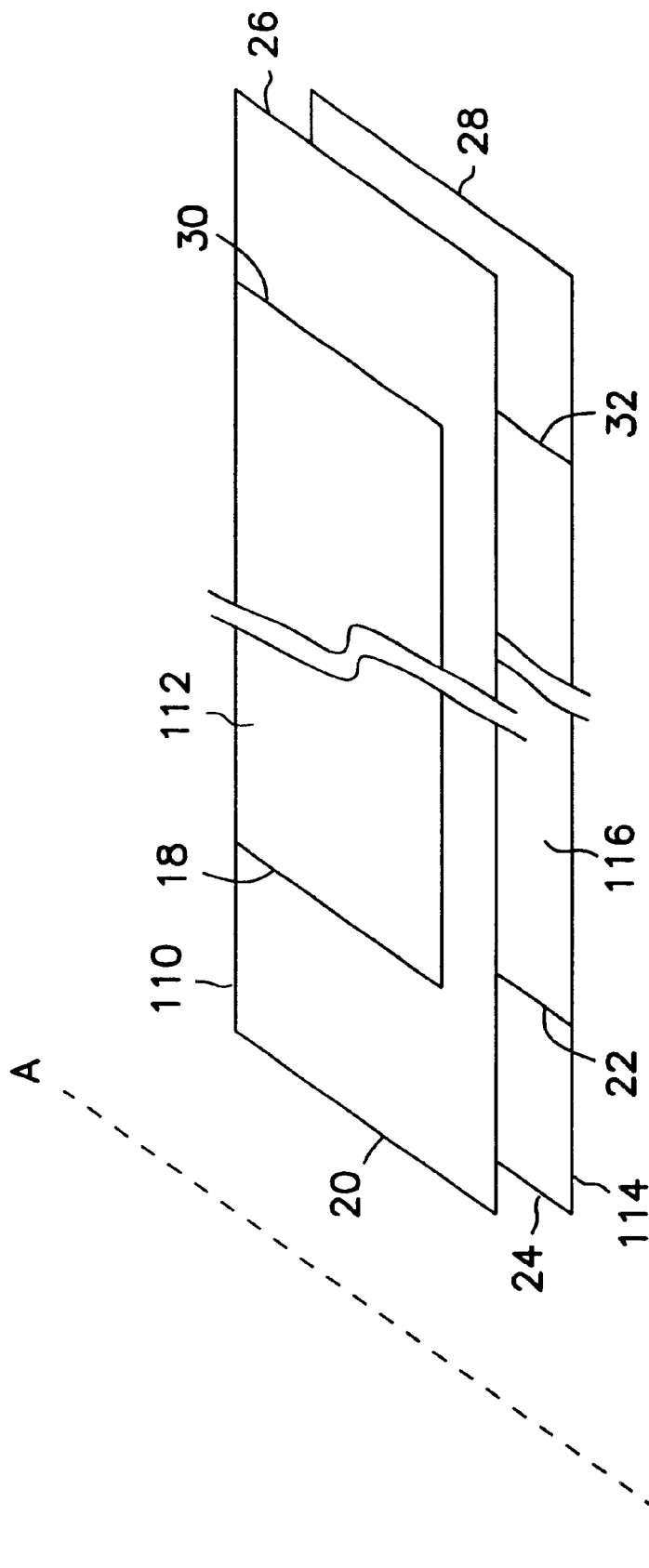
FIG. 3 is a perspective view of a first embodiment of an arrangement of metallized polymer films in accordance with the present invention, prior to being wound spirally about a mandrel to form a cylindrical capacitor.

Referring to FIG. 3, a first embodiment of the present invention is illustrated in which two metallized layers of polymer dielectric film are shown prior to being wound spirally about a mandrel to form a cylindrical capacitor. Components that correspond to similar components described above with respect to the prior art construction illustrated in FIGS. 1 and 2 are designated by similar reference numerals in the one hundred series. Film layer 110 has a metallized layer 112 that begins at a location 18 offset in the direction of winding from the starting end 20 of layer 110. Likewise, film layer 114 has a metallized layer 116 that begins at a location 22 offset in the direction of winding from the starting end 24 of layer 114. The amount of offset of the beginnings 18 and 22 of metallized layers 112 and 116 from the beginnings 20 and 24 of film layers 112 and 114 should be at least several multiples of the circumference of the mandrel on which the capacitor is to be wound. This will assure that wrinkling at the start of the winding process will be confined to an area of the windings devoid of metallization, thereby avoiding injury to the dielectric layer that lies between the metallized plates. A similar offset is provided at the ends 26 and 28 of film layers 110 and 114, respectively, whereby the metallized layers 1 12 and 116 terminate at locations 30 and 32. The amount of offset of the metallized layers at the end of the winding should be at least several multiples of the circumference of the capacitor at the end of winding. This will prevent failures due to shorting at the end of the windings.

Figure 4:
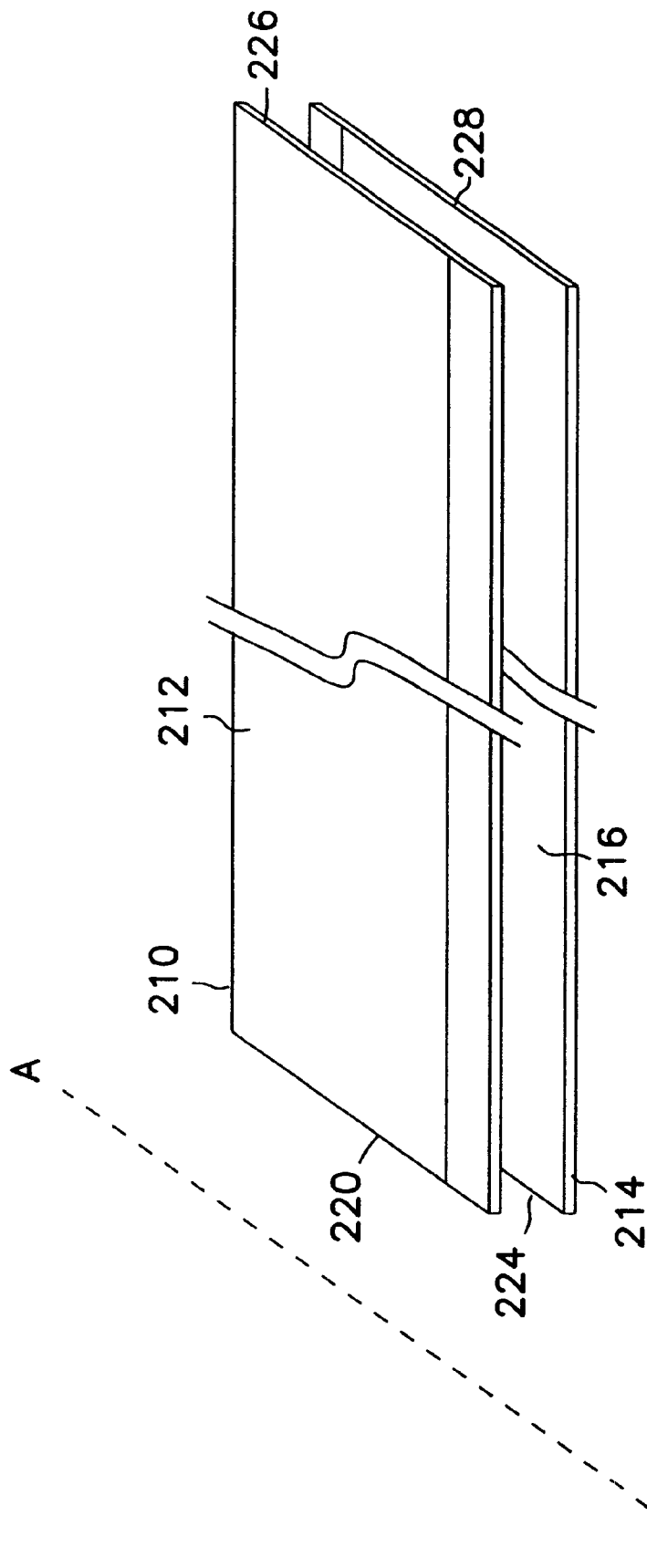
FIG. 4 is a perspective view of a second embodiment of an arrangement of metallized polymer films in accordance with the present invention, prior to being wound spirally about a mandrel to form a cylindrical capacitor.

Referring to FIG. 4, a second embodiment of the present invention is illustrated in which two metallized layers of polymer dielectric film are shown prior to being wound spirally about a mandrel to form a cylindrical capacitor. Components that correspond to similar components described above with respect to the prior art construction illustrated in FIGS. 1 and 2, and the first embodiment illustrated in FIG. 3, are designated by similar reference numerals in the two hundred series. Film layer 210 has a metallized layer 212. Likewise, film layer 214 has a metallized layer 216. Each of film layers 210 and 214 is of uniform thickness in a middle portion, but is tapered to an increased thickness at the beginning ends 220 and 224 and at the terminating ends 226 and 228.

As preferred, the film layer is tapered to an increased thickness over a distance in the direction of winding that is at least several multiples of the circumference of the mandrel, at the starting end, and at least several multiples of the capacitor circumference at the terminating end. By increasing the thickness of the dielectric at the ends of the winding, where failure modes are more likely to occur, the reliability of the capacitor is increased.

Figure 5:
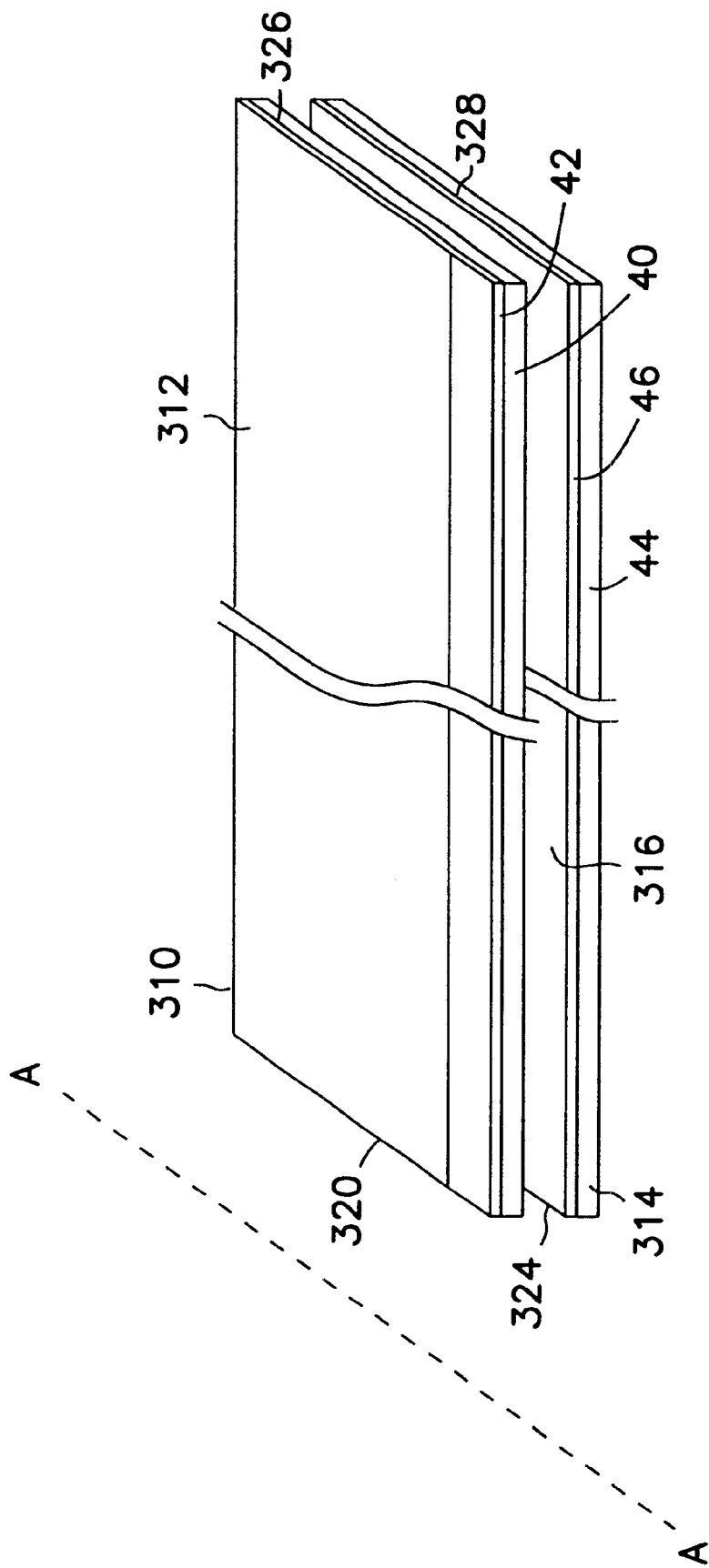
FIG. 5 is a perspective view of a third embodiment of an arrangement of metallized polymer films in accordance with the present invention, prior to being wound spirally about a mandrel to form a cylindrical capacitor.

Referring to FIG. 5, a third embodiment of the present invention is illustrated, in which two metallized layers of polymer dielectric film are shown prior to being wound spirally about a mandrel to form a cylindrical capacitor. Components that correspond to similar components described above with respect to the prior art construction illustrated in FIGS. 1 and 2, and the first embodiment illustrated in FIG. 3, are designated by similar reference numerals in the three hundred series. Film layer 310 has a metallized layer 312. Likewise, film layer 314 has a metallized layer 316. Unlike previously described embodiments, polymer film layer 310 is itself comprised of two layers of different polymers, the primary layer 40 being polyvinylidene fluoride, and the secondary layer 42 being polyester. The metallized layer 312 is deposited on the secondary layer 42. As preferred, the PVDF layer 40 with its high dielectric constant primarily determines the energy density characteristics of the capacitor. The polyester layer 42, with its significantly lower dielectric constant, is preferred to be much thinner than the PVDF layer 40 so as not to adversely affect the volume of the capacitor. The polyester layer 42 serves to improve the clearing, or self-healing characteristics of the composite dielectric layer 310. Similarly, polymer film layer 314 is itself also comprised of two layers of different polymers, the primary layer 44 being polyvinylidene fluoride, and the secondary layer 46 being polyester. The metallized layer 316 is deposited on the secondary layer 46.

Three specific embodiments have been described and illustrated in FIGS. 3, 4 and 5. It should be understood, however, that combining the features illustrated in the first three embodiments can make other embodiments. For example, the offsets of the metallic layers at the starting and terminating ends of the polymer film layers, as shown in FIG. 3, can be combined with the tapered dielectric as shown in FIG. 4, or with the composite dielectric as shown in FIG. 5, or with both the tapered dielectric of FIG. 4 and the composite dielectric of FIG. 5. Another desirable combination is the tapered dielectric of FIG. 4 in combination with the composite dielectric of FIG. 5. In the embodiment illustrated in FIG. 5, the preferred materials for the dielectric layer is PVDF and the preferred material for the self-healing enhancing layer is polyester. Other polymers could be substituted. The self-healing enhancing layer could be any polymer material having better self-healing characteristics than the material of the dielectric layer, although polymers having oxygen in their molecular structure are preferred.

I claim:

1. A thin film capacitor for use in an implantable defibrillator, comprising:

a first dielectric polymer film layer, said first layer having a metallized film on one side thereof, said first layer having a beginning and an end;

a second dielectric polymer film layer, said second layer having a metallized film on one side thereof, said second layer having a beginning and an end;

said first and second layers being overlain on each other and wound spirally with the metallized film of one layer adjacent the dielectric polymer of the other layer; and said second layer having a middle portion of substantially uniform thickness and a first portion that tapers in increasing thickness from said middle portion to said beginning of said second layer.

2. The thin film capacitor of claim 1, in which said second layer tapers in thickness over a distance in the direction of winding at least several multiples of the inner circumference of the capacitor.

3. The thin film capacitor of claim 1, in which said second layer has a second portion that tapers in increasing thickness from said middle portion to said end of said second layer.

4. The thin film capacitor of claim 3, in which said second portion of said second layer tapers thickness over a distance in the direction of winding at least several multiples of the inner circumference of the capacitor.

5. The thin film capacitor of claim 3, in which said first portion of said second layer tapers in increasing thickness over a distance in the direction of winding at least several multiples of the outer circumference of the capacitor.

* * * * *

UNITED STATES PATENT AND TRADEMARK OFFICE
CERTIFICATE OF CORRECTION

PATENT NO. : 6,514,276 B2
DATED : February 4, 2003
INVENTOR(S) : Mohammed Zafar Amin Munshi It is certified that error appears in the above-identified patent and that said Letters Patent is hereby corrected as shown below:

<u>Column 7,</u>
Line 29, delete "thin film" before "capacitor".

<u>Column 8,</u>
Lines 2 and 5, delete "said" after "thereof," and insert -- the -- therefor.
Line 4, delete "said" after "layer," and insert -- the -- therefor.
Lines 7 and 25, delete "said" before "first" and insert -- the -- therefor.
Line 8, insert -- about a winding axis, -- after "spirally".
Line 11, delete "said" and insert -- the -- therefor.
Line 13, delete "said" before "middle" and insert -- the -- therefor.
Line 13, delete "said" before "beginning" and insert -- the -- therefor.
Lines 14, 18, 20, 22 and 26, delete "said" before "second" and insert -- the -- therefor.
Line 14, insert -- in a direction substantially perpendicular to the winding axis -- after "layer".
Lines 15, 18, 21 and 25, delete "thin film" before "capacitor".
Line 15, delete "said" and insert -- the first portion of the -- therefor.
Line 16, insert -- increasing -- before "thickness".
Lines 16-17, delete "in the direction of winding at least several multiples of the inner circumference of the capacitor" and insert -- at least as great as a circumference of an associated winding mandrel -- therefor.
Line 20, delete "said" before "middle" and insert -- the -- therefor.
Line 20, delete "said" before "end" and insert -- the -- therefor.
Line 21, delete "said second" after "which" and insert -- the first -- therefor.
Line 22, insert -- in increasing -- before "thickness".
Lines 23-24, delete "in the direction of winding at least several multiples of the inner" after "distance" and insert -- as great as a -- therefor.
Line 24, delete "capacitor" and insert -- spirally wound first and second layers -- therefor.
Line 27, delete "the" before "direction" and insert -- a -- therefor.
Lines 27-28, delete "several multiples of the outer" and insert -- as great as a -- therefor.

UNITED STATES PATENT AND TRADEMARK OFFICE
CERTIFICATE OF CORRECTION

PATENT NO. : 6,514,276 B2
DATED : February 4, 2003
INVENTOR(S) : Mohammed Zafar Amin Munshi It is certified that error appears in the above-identified patent and that said Letters Patent is hereby corrected as shown below:

Column 8 (cont'd),
Line 28, delete "the capacitor" and insert -- an associated winding mandrel -- therefor.

Signed and Sealed this

Twenty-eighth Day of October, 2003

JAMES E. ROGAN
*Director of the United States Patent and Trademark Office*